United States Patent [19]
Linde et al.

[11] Patent Number: 5,407,137
[45] Date of Patent: Apr. 18, 1995

[54] MANURE SPREADER HAVING FLOATING AUGER

[75] Inventors: Gilbert W. Linde, New Holland; James T. Clevenger, Jr., Lancaster, both of Pa.

[73] Assignee: Ford New Holland, Inc., New Holland, Pa.

[21] Appl. No.: 846,113

[22] Filed: Mar. 5, 1992

Related U.S. Application Data

[62] Division of Ser. No. 616,157, Nov. 20, 1990, abandoned, which is a division of Ser. No. 340,441, Jan. 18, 1982, abandoned.

[51] Int. Cl.$^6$ ............................................. A01C 23/00
[52] U.S. Cl. .................................. 239/675; 239/672; 198/311
[58] Field of Search ...................... 178/670, 671, 311; 277/98, 101, 183; 239/672, 675

[56] References Cited

U.S. PATENT DOCUMENTS

| | | |
|---|---|---|
| 3,121,568 | 2/1964 | Wilkes et al. . |
| 3,423,030 | 1/1969 | Ayranto . |
| 3,765,526 | 10/1973 | Hubbard et al. . |
| 4,069,982 | 1/1978 | Brackbill . |
| 4,082,227 | 4/1978 | McGrane et al. . |
| 4,117,920 | 10/1978 | Oury . |
| 4,467,967 | 8/1984 | Martin . |
| 4,473,184 | 9/1984 | Martin . |
| 4,993,632 | 2/1991 | Martin . |

FOREIGN PATENT DOCUMENTS

| | | |
|---|---|---|
| 37517 | 4/1886 | Germany . |
| 2014835 | 2/1978 | United Kingdom . |

Primary Examiner—Andres Kashnikow
Assistant Examiner—Christopher G. Trainor
Attorney, Agent, or Firm—Larry W. Miller; Frank A. Seemar

[57] ABSTRACT

A manure spreader has a tank with endwalls including guides for receiving opposite ends of a rotating auger shaft thus permitting a change of position of the rotating auger in the tank relative to the manure. The auger may change position in response to the condition of the manure or may be a controlled change in response to actuation of fluid powered pistons.

17 Claims, 3 Drawing Sheets

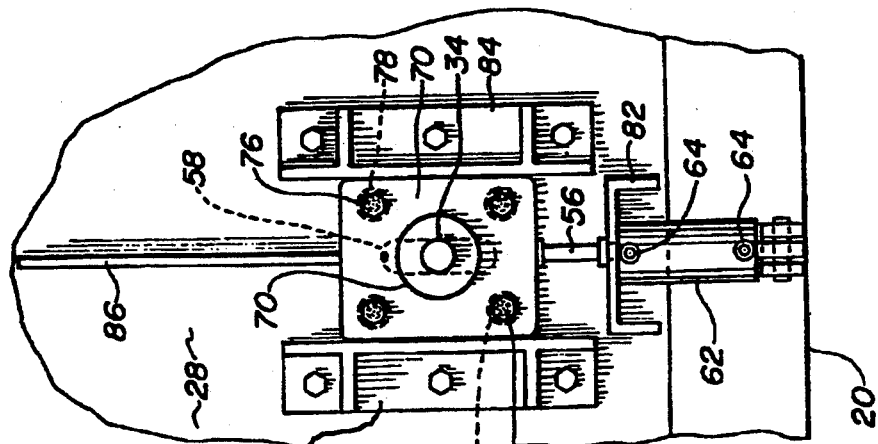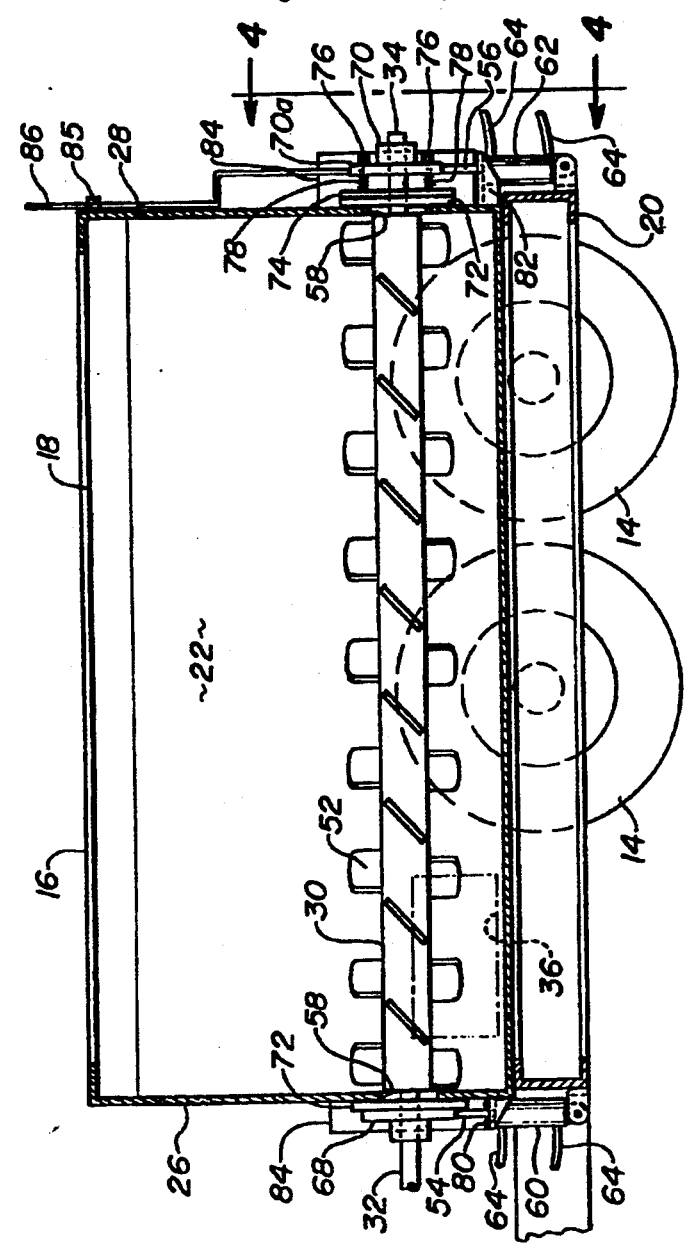

MANURE SPREADER HAVING FLOATING AUGER

CROSS-REFERENCE TO RELATED APPLICATIONS

This is a division of U.S. patent application Ser. No. 616,157, filed Nov. 20, 1990, which was a division of U.S. patent application Ser. No. 340,441, filed Jan. 18, 1982, now abandoned.

BACKGROUND OF THE INVENTION

This invention relates generally to fluid diffusing including flow deflecting means and, more particularly, to wet slurry type manure spreaders.

In a slurry type of manure spreader, particularly of the type having a rotating auger, relatively sticky type pen manure is sometimes used. Due to a sticky consistency, the manure will sometimes bridge above the auger and will not feed properly in order to be expelled from the spreader.

Also, in slurry type spreaders, a wetter slurry is sometimes used. Although the wetter slurries do not tend to bridge as does the sticky manure, the wetter slurries are prone to freezing in appropriate weather conditions. Further, both the sticky and the wetter slurry type manures are apt to contain rocks and when this occurs, the rocks can wedge between paddles on the auger and the side of the spreader tank. This condition can cause paddle and tank damage.

Furthermore, the slurry type manures are somewhat liquid in consistency and tend to seek their own level. The positioning of a movable auger within the tank of a manure spreader and extending through the endwalls of the tank for driving connection with a drive mechanism to effect rotation thereof creates a problem of maintaining the liquified manure within the confines of the tank without leaking through the slots formed in the endwalls to accommodate the vertical movement of the auger.

The foregoing illustrates limitations of the known prior art. Thus, it is apparent that is would be advantageous to provide an alternative directed to overcoming one or more of the limitations as set forth above. Accordingly, a suitable alternative is to provide a slurry type spreader which avoids bridging, freezing and rock damage.

SUMMARY OF THE INVENTION

In one aspect of the present invention, this is accomplished by providing a manure spreader having an adjustable and a rotatable auger. The auger extends between the endwalls of the spreader tank. Means are provided for shifting the position of the auger in the tank. Guides are provided to limit the shift of the auger by a predetermined distance. The auger is free to move vertically relative to the means for shifting the position of the auger in the tank, whereby the auger is free to float over obstacles inside the tank within the confines of the slots in the tank endwalls.

Placement of the guide slots in the endwalls to facilitate vertical movement of the auger provides a means through which the liquid component of the manure within the tank can leak externally of the tank. Accordingly, seals are provided to prevent leakage of the manure from the endwall slots while permitting the auger bearings and the auger to vertically move within the slot. These seals include a plate of synthetic material and a plurality of compression springs mounted to impose an axial load on the seal via the auger.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a partial side elevational view illustrating an embodiment of this invention taken along line 3—3 of FIG. 2; and FIG. 4 is a partial end view taken along the line 4—4 of FIG. 3.

DESCRIPTION OF THE PREFERRED EMBODIMENT

Figure 1:
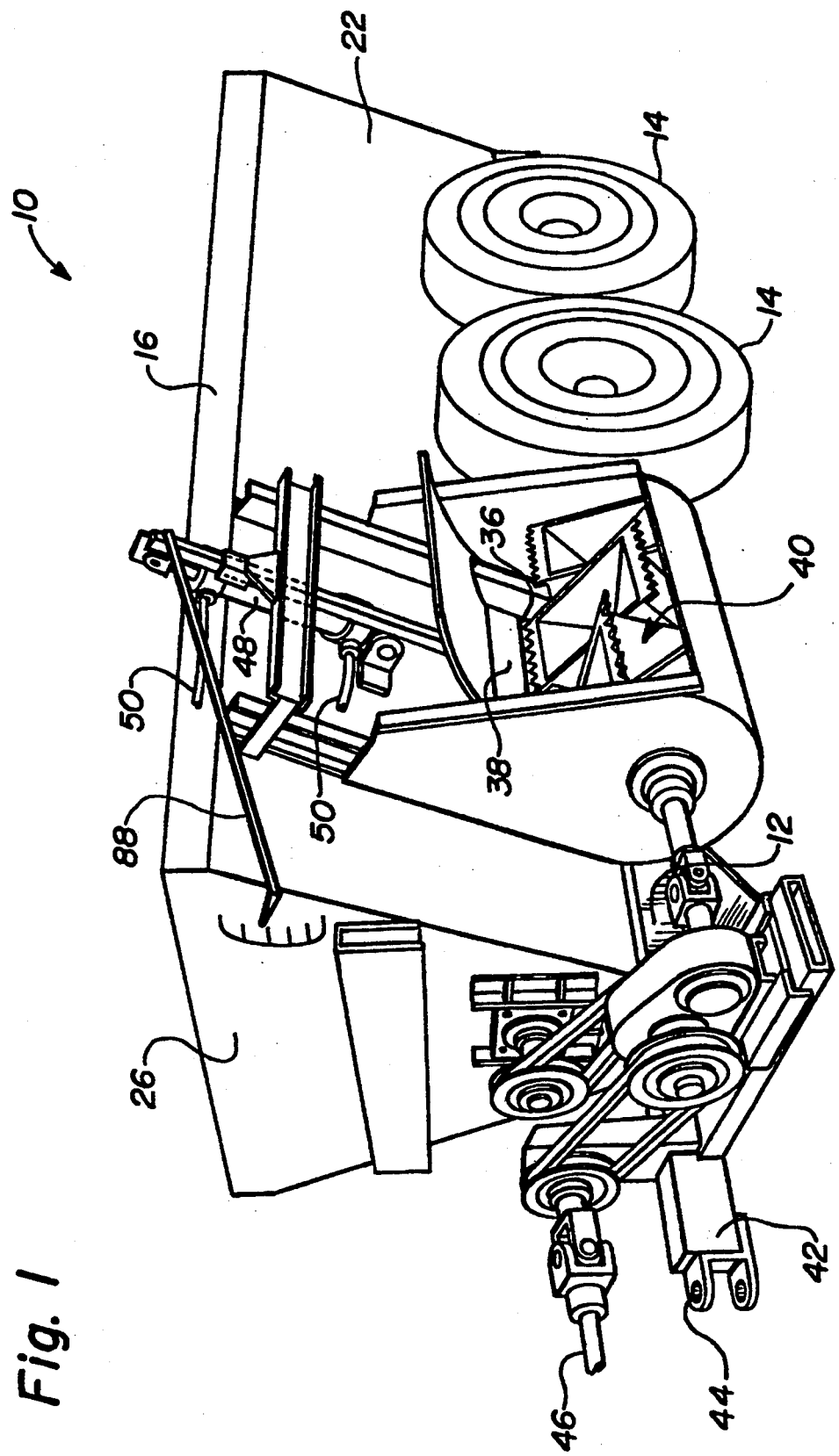
FIG. 1 is a perspective view illustrating an embodiment of a wet slurry type of manure spreader.
Figure 2:
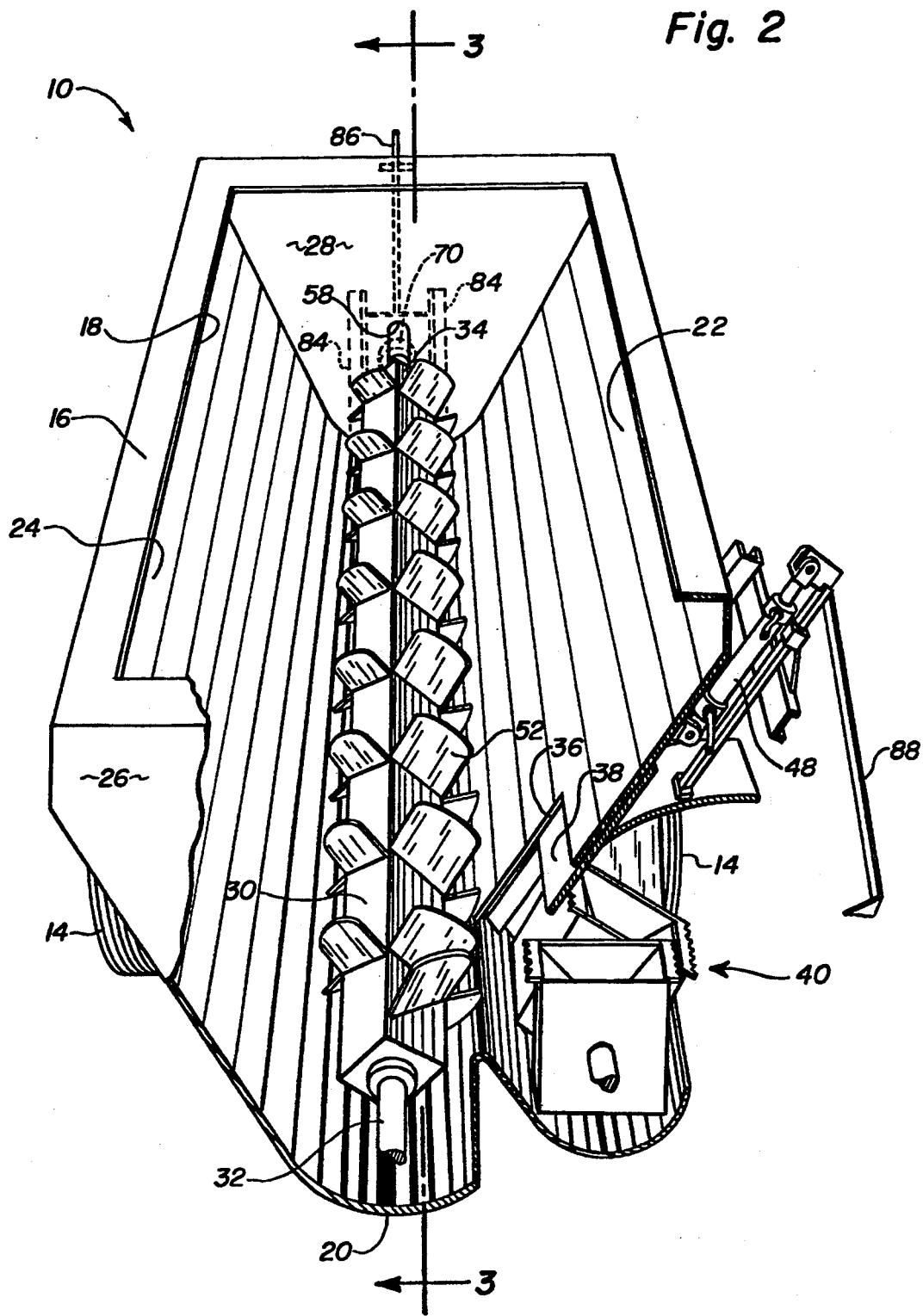
FIG. 2 is another perspective view illustrating an embodiment of an auger including paddles in combination with the wet slurry spreader of FIG. 1.

FIGS. 1 and 2 illustrate a known manure spreading apparatus generally designated 10. Spreader 10 includes a main frame 12 including a plurality of wheels 14 whereby spreader 10 is a mobile unit. Spreader 10 includes a manure containing portion or tank 16 mounted on frame 12. Portion or tank 16 generally includes a top 18, which may be open and a bottom 20 interconnected with a pair of sidewalls 22, 24 and a pair of endwalls 26, 28. Sidewalls 22, 24 converge toward bottom 20.

An auger 30 is rotatably mounted within manure containing portion 16 adjacent bottom 20 and is supported at opposite ends 32, 34 in endwalls 26, 28 respectively. One of the sidewalls 22 includes an opening 36 formed therein and a movable door 38 mounted adjacent opening 36.

A rotating expelling apparatus 40 is rotatably mounted adjacent opening 36 for expelling manure from the spreader 10.

A drawbar 42 and hitch 44 are attached to frame 12 to provide for connection to a towing vehicle such as an agricultural tractor (not shown). Also, a well known power takeoff (PTO) connection 46 is provided for transmitting power from the tractor for rotatably operating auger 30 and expelling apparatus 40. A well known fluid powered cylinder 48 is connected to spreader 10 for varying the position of door 38. Power for operating cylinder 48 is readily available via high pressure conduits 50 which can also be connected to receive power from the tractor.

It is well known that auger 30 is provided with auger flighting or paddles 52 for moving manure toward opening 36 whereby, with door 38 moved to a suitable open position, expeller 40 is fed with a substantially continuous supply of manure to be expelled for the purpose of spreading a pattern of fertilizer on a field.

The present invention provides for mounting opposite ends 32, 34 of auger 30 in guides such as elongated slots 58 formed in endwalls 26, 28 which permits auger 30 to, not only rotate, but shift or change rotating positions within manure containing portion 16, see FIGS. 3 and 4. In this manner, auger 30 is permitted to move freely in response to the condition of the manure. For example since auger 30 is adjacent bottom 20 where sides 22, 24 converge, debris could wedge between one of the paddles 52 and a sidewall 22, 24. Should this occur, the rotating auger could act against the debris causing a reaction sufficient for moving auger 30 a predetermined distance from one rotating position to another within the limits of slots 58.

Means, such as fluid power cylinders 60, 62 are provided for adjusting the position of auger 30. Cylinders 60, 62 are commercially available and are preferably operated by hydraulic power available from an associated tractor, as aforesaid endwalls 26, 28 respectively. Pistons 54, 56 are extendable from cylinders 60, 62 in response to hydraulic actuation.

Each end 32, 34 of auger 30 is secured to a respective bearing 68, 70 permitting free rotation of auger 30 therein. Preferably a seal 72 comprising a plate of synthetic material is carried by each end 32, 34 and is positioned between each bearing 68, 70 and a respective endwall 26, 28. In this manner, leakage of manure through slots 58 is limited. Preferably, a steel plate 74 is between bearing 70 and in abutment with one of the seals 72. A plurality of pins 76 are attached to plate 74 by welding or the like, and extend slidably through a flange 70a of bearing 70. A spring 78 is carried by each pin 76 and is compressed between plate 74 and bearing 70. In this manner, an axial load is transmitted via auger 30 to be imposed on each seal 72.

Should freezing manure, adjacent bottom 20, arrest rotation of auger 30, pistons 64, 66 can be actuated to extend and engage bearings 68, 70, respectively, thus freeing auger 30 to move within the limits of slots 58. Also, when sticky pen manure bridges above rotating auger 30, pistons 64, 66 can be actuated to raise auger 30 within the limits of slots 58 thus freeing the bridged manure. When pistons 64, 66 are retracted into the respective cylinders 60, 62 bearings 68, 70 can rest on stops 80, 82 respectively, formed of reinforced fabricated steel plates and preferably welded to respective endwalls 26, 28.

Means, such as reinforced, fabricated steel angles are preferably bolted to each endwall 26, 28 to form retainers 84, for retaining the movement of bearings 68, 70 and thus limiting extensive slop and play of auger ends 32, 34 in slots 58. Also, metal to metal wear between auger ends 32, 34 and respective endwalls 26, 28 is avoided.

Means, such as a rod 86, is connected to auger 30, preferably at bearing 70, for extending through a guide 85 and above endwall 28, for visually indicating relative positions of auger 30 in slots 58. Also, means such as pointer 88, is connected to move with door 88 for visually indicating various positions of door 38.

The present invention anticipates other means permitting auger 30 to shift position relative to manure containing portion 16. For example, it may be desirable to mount auger ends 32, 34 on guides such as pivotal arms mounted inside manure containing portion 16 which can be moved to raise or lower auger 30.

The foregoing has described a slurry type manure spreader having a floating auger which avoids bridging, freezing and rock damage.

It is anticipated that aspects of the present invention, other than those specifically defined in the appended claims, can be obtained from the foregoing description and the drawings.

Having thus described the invention, what is claimed is:

1. A manure spreading apparatus comprising:
    a manure containing portion having a top and a bottom interconnected with sidewalls and a pair of endwalls;
    an auger rotatably mounted in a rotating position extending between the endwalls; and
    lift means interconnecting the spreader and auger for vertically raising said auger within slots formed in said endwalls relative to said manure containing portion from said rotating position to a second rotating position, said auger being positioned above said lift means to permit said lift means to raise said auger within said slots, yet is separable from said lift means to permit said auger to be raised by forces exerted thereon by other than said lift means.

2. The apparatus of claim 1 including:
    first and second ends of said auger extending through a respective slot formed in each endwall; and
    said lift means being linear actuators anchored on said manure containing portion and being operably associated with said ends for shifting said auger in said slots.

3. The apparatus of claim 2 including:
    guide means supported by each said endwall adjacent the corresponding slot for retaining movement of each respective end in said slots.

4. The apparatus of claim 3 including:
    bearings rotatably supporting each said auger end adjacent each respective slot, said lift means being engageable with said bearings to effect vertical movement of said auger ends.

5. The apparatus of claim 4 wherein said slots extend vertically between said top and said bottom of said manure containing portion.

6. The apparatus of claim 4 wherein said guide means includes a stop to limit the vertical movement of said auger ends.

7. The apparatus of claim 6 wherein said lift means includes a fluid powered cylinder and associated piston mounted to said spreader adjacent each said auger end.

8. A manure spreading apparatus comprising:
    a manure containing portion having a top and a bottom interconnected with sidewalls and a pair of endwalls;
    means for moving manure in said manure containing portion, said means including an auger rotatably mounted in and extending between the endwalls;
    a movable door mounted on one of said sidewalls adjacent an opening formed in said one sidewall;
    means adjacent said door for rotatably throwing manure from said manure containing portion in response to said door being open; and
    means for adjusting the position of the auger in the manure containing portion, said means including first and second ends of said auger extending through a respective slot formed in each endwall, said means also including power means operably engageable with said first and second ends for moving said auger in said slots, said auger being separable from said power means to permit vertical movement of said auger independently of said power means within the entire range of movement defined by said slots.

9. The manure spreading apparatus of claim 8 wherein said power means is positioned beneath said first and second ends of said auger to permit said power means to raise said auger within said slots.

10. The manure spreading apparatus of claim 9 wherein said auger is vertically movable downwardly within said slots only through the force of gravity.

11. A manure spreading apparatus comprising:
a manure containing portion having a top and a bottom interconnected with sidewalls and a pair of endwalls;
a power member connected adjacent each endwall;
an auger rotatably mounted in the manure containing portion adjacent said bottom, said auger including first and second ends each extending through a respective slot formed in each endwall, said auger being movable within said slots in response to either of the condition of manure in said manure containing portion or in response to actuation of said power members to raise said auger, said power members being operable only to raise said auger.

12. The apparatus of claim 11 wherein said auger is movable upwardly and downwardly in said manure containing portion within said slots in response to varying conditions in said manure containing portion.

13. The apparatus of claim 12 wherein said auger ends are movable upwardly and downwardly independently of each other.

14. The apparatus of claim 13 wherein said power members are hydraulic cylinders mounted from said manure containing portion for engagement with the corresponding end of said auger.

15. The apparatus of claim 11 wherein said power members are positioned beneath said first and second ends of said auger to permit said power members to raise said auger within said slots.

16. The apparatus of claim 15 wherein said auger is vertically movable downwardly within said slots only through the force of gravity.

17. The apparatus of claim 15 wherein said auger is movable independently of said power members within the entire range of movement defined by said slots.

* * * * *